United States Patent [19]

Kline

[11] 4,072,654

[45] Feb. 7, 1978

[54] 3-(4-ANILINOPHENOXY)-2-HYDROXYPROPYL SULFIDES, ETHERS AND AMINES AS ANTIOXIDANTS

[75] Inventor: Richard H. Kline, Cuyahoga Falls, Ohio

[73] Assignee: The Goodyear Tire & Rubber Company, Akron, Ohio

[21] Appl. No.: 751,495

[22] Filed: Dec. 17, 1976

[51] Int. Cl.$^2$ .................. C08K 5/36; C08K 5/18; C07C 79/46; C07C 69/34; C07C 91/16; C07C 91/06

[52] U.S. Cl. .................. 260/45.9 QB; 260/45.85 A; 260/571; 260/573

[58] Field of Search .............. 260/45.85 N, 45.9 QB, 260/488 CD, 485 J, 485 G, 571, 573, 570.7, 45.85 A, 471 R

[56] References Cited

U.S. PATENT DOCUMENTS

| | | |
|---|---|---|
| 3,240,703 | 3/1966 | Symon et al. .................. 260/571 |
| 3,351,609 | 11/1967 | Brimer et al. .................. 260/45.9 QB |
| 4,009,198 | 2/1977 | Pawlak et al. .................. 260/485 J |

FOREIGN PATENT DOCUMENTS

| | | |
|---|---|---|
| 324,248 | 2/1972 | U.S.S.R. |
| 242,375 | 5/1971 | U.S.S.R. |

Primary Examiner—V. P. Hoke
Attorney, Agent, or Firm—F. W. Brunner; J. A. Rozmajzl; D. B. Little

[57] ABSTRACT

Compounds such as 1-(4-anilinophenoxy)-3-dodecanethio-2-propanol are formed by reaction between an epoxypropoxydiphenylamine and a thiol, an alcohol or an amine. The compounds produced are useful as antioxidants for natural and synthetic elastomers.

17 Claims, No Drawings

3-(4-ANILINOPHENOXY)-2-HYDROXYPROPYL SULFIDES, ETHERS AND AMINES AS ANTIOXIDANTS

BACKGROUND OF THE INVENTION

This invention relates to 3-(4-anilinophenoxy)-2-hydroxypropyl sulfides, ethers and amines which are useful in the protection of polymers against the deleterious effects of oxygen. It also relates to a method for preparation and use of these materials and to the compositions formed by mixing these materials with polymers.

Phenolic amides, including some with diphenylamine moieties, have been used in the rubber chemicals field as age resistors and antihardeners. Some of the patents disclosing such compounds are: U.S. Pat. Nos. 3,975,414; 3,658,769; 3,767,628; 3,867,334; and 3,679,744.

SUMMARY OF THE INVENTION

The objectives of this invention are: (1) to provide novel 3-(4-anilinophenoxy)-2-hydroxypropyl sulfides, ethers and amines for the protection of polymers against oxidative degradation; (2) to provide polymers stabilized against oxygen attack; and (3) to provide a process for the preparation of said 3-(4-anilinophenoxy)-2-hydroxypropyl sulfides, ethers and amines. Other objects will become apparent as this description proceeds.

The objects of this invention are accomplished by the preparation and use as antioxidants in polymers of 3-(4-anilinophenoxy)-2-hydroxypropyl sulfides, ethers and amines, having the following structural formula, AZR, wherein A has the following structure

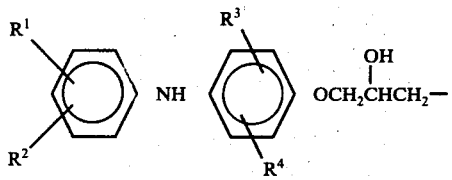

wherein $R^1$ and $R^2$ are selected from the group consisting of H, alkyl radicals of 1 to 4 carbons and alkoxy radicals of 1 to 4 carbons; $R^3$ and $R^4$ are selected from the group consisting of H and alkyl radicals of 1 to 4 carbons (1–4C); R is selected from the group consisting of alkyl radicals (1–20C), phenyl, alkyl-substituted phenyl radicals, aralkyl radicals (7–12C), an acyloxyalkyl of the structure $-CH_2(CH_2)_nCOOR^5$, wherein $R^5$ is an alkyl (1–4C) and n is 0 or 1, the group A, and the group XA, wherein X is a moiety of the structure

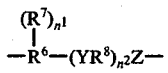

wherein $R^6$ is selected from the group consisting of alkylene radicals (1–6C), cycloalkylene radicals (5–12C) and $-R^{11}-R^{10}-(R^{12})_n3$ wherein $R^{10}$ is a cycloalkylene (5–12C), $R^{11}$ and $R^{12}$ are alkylene radicals (1–6C) and $n^3$ is 0 or 1; $R^7$ is an alkyl radical (1–4C); $R^8$ is an alkylene radical (1–6C); Y is selected from the group consisting of —O—, —S—, 1,4-phenylene,

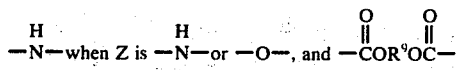

wherein $R^9$ is an alkylene radical (2–6C) which can be substituted by the group

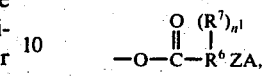

$n^1$ is 0 to 4; and Z is selected from the group consisting of

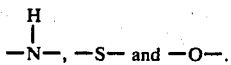

In the preferred embodiments $R^1$, $R^2$, $R^3$ and $R^4$ are H or —$CH_3$.

For purposes of this specification, the term alkyl-substituted phenyl radicals means phenyl radicals substituted in one, two or three positions by alkyl radicals (1–4C) which may be straight chain or branched. One or two groups is the preferred number. Methyl is the preferred alkyl. The preferred position on the phenyl ring for a single substituent is para.

The symbol $n^2$ is 0 or 1 with the proviso that when Y and Z are both

or both —O— then $n^2$ is 0–6.

The compounds of the present invention can be prepared by reaction between an epoxypropoxydiphenylamine and a thiol, an amine or an alcohol. The antioxidant compounds of this invention are incorporated in organic materials susceptible to oxidative degradation in order to retard such degradation.

The following list of compounds is presented to illustrate but not limit the compounds of this invention.

1. Methyl [3-(4-anilinophenoxy)-2-hydroxypropylthio]propionate.
2. 1-(4-anilinophenoxy)-3-dodecanethio-2-propanol.
3. 1,10-bis(4-anilinophenoxy)-4,7-dithia-2,9-decanediol.
4. 1,1,1-tris[methylene (3-(4-anilinophenoxy)-2-hydroxypropylthio) propionate] propane.
5. 1,5-bis[3-(4-anilinophenoxy)-2-hydroxypropylthio]cyclooctane.
6. 1,10-bis(4-anilinophenoxy)-4,7-dithia-5-methyl-2,9-decanediol.
7. 1-(4 anilino-2-methylphenoxy)-3-dodecanethio-2-propanol.
8. 1,10-bis(4-anilino-2-methylphenoxy)-4,7-dithia-2,9-decanediol.
9. 1,13-bis(4-anilinophenoxy)-4,10-dithia-7-oxa-2,12-tridecanediol.
10. 1,10-bis[4-(4-methylanilino)phenoxy]-4,7-dithia-2,9-decanediol.
11. 1,10-bis[4-(3,4-dimethylanilino)phenoxy]-4,7-dithia-2,9-decanediol.
12. 1,10-bis[4-(4-methoxyanilino)phenoxy]-4,7-dithia-2,9-decanediol.
13. 1-(4-anilinophenoxy)-3-(phenylthio)-2-propanol.
14. 1-(4-anilinophenoxy)-3-(benzylthio)-2-propanol.

15. 2,9-bis[3-(4-anilinophenoxy)-2-hydroxypropylthio]-p-menthane.
16. 1,10-bis(4-anilinophenoxy)-4,7-diaza-2,9-decanediol.
17. 1,10-bis(4-anilinophenoxy)-4,7-dioxa-2,9-decanediol.
18. 1,16-bis(4-anilinophenoxy)-4,7,10,13-tetraoxa-2,15-hexadecanediol.
19. 1-(4-anilinophenoxy)-3-octadecylamino-2-propanol.
20. 1-(4-anilinophenoxy)-3-octyloxy-2-propanol.
21. 1-(4-anilinophenoxy)-3-phenoxy-2-propanol.
22. 1-(4-anilinophenoxy)-3-anilino-2-propanol.

All of the above listed compounds have been prepared. The preparation of compounds 1, 4, 17 and 19 is described in working examples I to IV.

PREFERRED EMBODIMENTS OF THE INVENTION

The sulfides of this invention are synthesized by the reaction between an epoxypropoxydiphenylamine and a thiol or hydrogen sulfide in a solvent, such as one of the lower alcohols, in the presence of a catalytic amount of base, such as an alkali metal hydroxide. The ethers and amines of this invention are synthesized by a similar reaction in which the thiol is replaced by an alcohol or an amine respectively. Reaction temperature may vary between room temperature and the boiling point of the solvent. The base is in a preferred concentration range of 0.01 to 0.5 molar. Reactants preferably are charged in stoichiometric amounts, although other ratios will yield the same product.

Illustrative examples of epoxypropoxydiphenylamines which can be used are 4-(2,3-epoxypropoxy)diphenylamine and 4-(2,3-epoxypropoxy)-3-methyldiphenylamine.

Illustrative examples of suitable thiols are: methyl 3-mercaptopropionate, dodecanethiol, 1,2-ethanedithiol, and 1,1,1-tris (methylene 3-mercaptopropionate) propane.

Examples of bases which will catalyze the reaction are: sodium hydroxide and potassium hydroxide.

Solvents which may be used include ethanol, 1-propanol and isopropyl alcohol.

The reaction is illustrated by the examples which follow, but these examples are not to be considered limitations on the invention. Unless otherwise stated, percentages are by weight and parts are parts by weight.

EXAMPLE I

Methyl [3-(4-anilinophenoxy)-2-hydroxypropylthio]propionate

A solution of 18.0 grams of 4-(2,3-epoxypropoxy) diphenylamine, 9.0 grams of methyl 3-mercaptopropionate, and 0.75 grams of potassium hydroxide in 75 milliliters of ethanol was stirred at room temperature for 2½ hours. The reaction mixture was then poured into 500 milliliters of water and the brown oil which precipitated was separated by extraction with benzene. The extract was stipped on a rotary evaporator leaving 25.5 grams of a dark oil which was identified by means of its NMR spectrum.

EXAMPLE II 1,1,1-tris[methylene (3-(4-anilinophenoxy)-2-hydroxypropylthio)propionate]propane A solution of 18.0 grams of 4-(2,3-epoxypropoxy) diphenylamine, 9.95 grams of 1,1,1-tris)methylene 3-mercaptopropionate) propane, and 0.75 grams of potassium hydroxide in 75 milliliters of ethanol was stirred for 5 hours. Early in the reaction, the temperature rose from 23° to 38° C. and then began to drop. At the end of the reaction period, 4 milliliters of concentrated hydrochloric acid was added to the mixture which was then decanted from the precipitated potassium chloride. The decant was stipped on a rotary evaporator leaving a dark viscous residue which weighed 32 grams. The NMR spectrum of this product shows it to consist primarily of 1,1,1-tris[methylene (3-(4-anilinophenoxy)-2-hydroxypropylthio) propionate]propane.

EXAMPLE III 1,10-bis(4-anilinophenoxy)-4,7-dioxa-2,9-decanediol

Sodium (0.25 grams) was added to a solution of 2.32 grams of ethylene glycol in 50 milliliters of 1,2-dimethyloxyethane and the mixture was stirred until the sodium had dissolved. There was then added 18.0 grams of 4-(2,3-epoxypropoxy)diphenylamine and the mixture was heated under reflux for 2.5 hours. An additional 0.25 grams of sodium was added to the reaction mixture which was then heated under reflux for 6.5 hours. The reaction mixture was poured into a mixture of 5 milliliters of concentrated hydrochloric acid and 300 milliliters of water. The oil which precipitated was separated from the aqueous layer by extraction with a toluene-acetone mixture. The extract was evaporated on a rotary evaporator yielding 20 grams of a dark viscous oil. The NMR spectrum of this product showed it consisted largely of 1,10-bis(4-anilinophenoxy)-4,7-dioxa-2,9-decanediol.

EXAMPLE IV 1-(4-anilinophenoxy)-3-(octadecylamino)-2-propanol

A mixture of 12.05 grams of 4-(2,3-epoxypropoxy)diphenylamine, 13.45 grams of octadecylamine, and 100 milliliters of methanol was heated under reflux for 7 hours. The reaction mixture was allowed to cool to room temperature. The solid which precipitated from solution during cooling was filtered off and allowed to dry. There was obtained 13.9 grams of 1-(4-anilinophenoxy)-3-(octadecylamino)-2-propanol which melted at 81°–86° C.

It is possible with certain reactants to obtain bis and tris compounds such as compounds 5 and 4 respectively. Bis compounds are obtained when hydrogen sulfide or a dithiol, a diol or a diamine is used in the reaction, in which case there are two moles or more of epoxypropoxydiphenylamine charged to the reaction per mole of dithiol or hydrogen sulfide, diol or diamine. The bis compounds correspond to molecular structures in which R is A or XA wherein $R^9$ is not substituted.

Where $R^9$ is substituted by the group

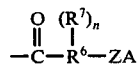

the tris compounds are obtained. These are synthesized in one way by the use of a trithiol, triol or triamine in the reaction.

The compounds of this invention protect from oxidative degradation such organic materials as vulcanized and unvulcanized polymers which include natural rubber (balata, gutta percha) and synthetic iene polymers.

Representative of the synthetic diene polymers used in the practice of this invention are homopolymers of conjugated 1,3 dienes such as isoprene, chloroprene and 1,3-butadiene, as well as copolymers of conjugated dienes with one or more copolymerizable monomers such as styrene or acrylonitrile.

The exact amount of antioxidant employed will depend on the polymer and the conditions to which it will be exposed. In general they are employed in concentrations ranging from 0.05 to 10 parts per 100 parts of rubber. More specifically, a concentration close to one part per 100 parts of polymer is advantageous.

The addition of these antioxidants to polymers may be by any of the conventional methods, for example, by direct addition to the solid compound in a mill or addition to the emulsion or solution form of the polymer.

Compounds 1-6, 8-9 and 13-16 were tested in SBR 1006. The tested compounds were each mixed with a benzene solution of SBR-1006 at a concentration of one part per 100 parts rubber. Oxygen absorption tests were made on the films obtained by evaporation of the benzene. The testing procedure is of the type described in further detail in *Industrial and Engineering Chemistry*, Vol. 43, page 456 (1951) a and Industrial and Engineering Chemistry, Vol. 45, p. 392 (1953). Results appear in Table 1.

Table 1

| Compound | Hours to Absorb 1% $O_2$ at 100° C. |
|---|---|
| 1 | 640 |
| 2 | 751 |
| 3 | 741 |
| 4 | 326 |
| 4 | 972 |
| 6 | 647 |
| 8 | 783 |
| 9 | 626 |
| 13 | 763 |
| 14 | 640 |
| 15 | 738 |
| 16 | 670 |
| Commercial Antioxidant | 338 |

All of the compounds exhibited antioxidant activity, and all but one better than the commercial product tested. Had no antioxidant been present, the SBR would have absorbed 1.0% $O_2$ in 5 to 10 hours.

The preferred compounds are numbers 3, 5 and 8.

While certain representative embodiments and details have been shown for the purpose of illustrating the invention, it will be apparent to those skilled in this art that various changes and modifications may be made therein without departing from the spirit or scope of the invention.

What is claimed is:

1. A compound having the following structural formula:

AZR wherein A has the following structure:

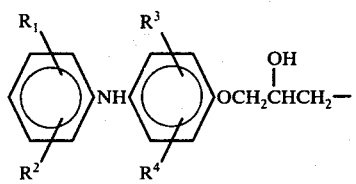

wherein $R^1$ and $R^2$ are selected from the group consisting of H, alkyl radicals of 1 to 4 carbons, and alkoxy radicals of 1 to 4 carbons; $R^3$ and $R^4$ are selected from the group consisting of H and alkyl radicals of 1 to 4 carbons (1-4C); R is selected from the group consisting of alkyl radicals (1-20C), phenyl or alkyl-substituted phenyl radicals, aralkyl radicals (7-12C); an acyloxyalkyl of the structure $-CH_2(CH_2)_nCOOR^5$, wherein $R^5$ is an alkyl (1-4C) and $n$ is 0 or 1, the group A, and the group XA wherein X is a moiety of the structure

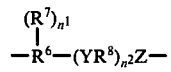

wherein $R^6$ is selected from the group consisting of alkylene radicals (1-6C), cycloalkylene radicals (5-12C) and $-R^{11}-R^{10}-(R^{12})_{n}3$ wherein $R^{10}$ is a cycloalkylene (5-12C), $R^{11}$ and $R^{12}$ are alkylene radicals (1-6C) and $n^3$ is 0 or 1, $R^7$ is selected from the group consistng of alkyl radicals (1-4C); $R^8$ is selected from the group consisting of alkylene radicals (1-6C); Y is selected from the group consisting of $-O-$, $-S-$, 1,4-phenylene,

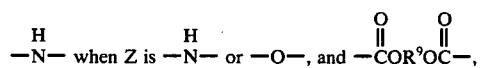

wherein $R^9$ is an alkylene radical (2-6C) which may be substituted by the group

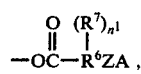

$n^1$ is 0 to 4; $n^2$ is 0 or 1 with the proviso that when Y and Z are both

or both $-O-$ then $n^2$ can be 0-6, and Z is selected from the group consisting of

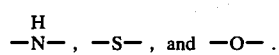

2. The compound of claim 1 wherein $R^1$, $R^2$, $R^3$ and $R^4$ are selected from the group consisting of H and $-CH_3$.

3. The compound of claim 2 in which R is XA.

4. The compound of claim 3 wherein $R^6$ is a cycloalkylene radical (5-12C).

5. The compound of claim 3 wherein $R^6$ is ethylene.

6. The compound of claim 5 which is 1,10-bis(4-anilinophenoxy)-4,7-dithia-2,9-decanediol.

7. The compound of claim 5 which is 1,10-bis(4-anilino-2-methylphenoxy)-4,7-dithia-2,9-decanediol.

8. The compound of claim 4 which is 1,5-bis[3-(4-anilinophenoxy)-2-hydroxypropylthio]cyclooctane.

9. A diene polymer susceptible to oxidative degradation having incorporated therein a compound according to claim 1.

10. A diene polymer selected from the group consisting of polyisoprene, polybutadiene, styrene-butadiene rubber, acrylonitrile-butadiene rubber, and neoprene in which the compound of claim 1 has been incorporated in a concentration of 0.05 to 10 parts per 100 parts of rubber.

11. A diene polymer selected from the group consisting of polyisoprene, polybutadiene, styrene-butadiene rubber, acrylonitrile-butadiene rubber, and neoprene in which the compound of claim 2 has been incorporated in a concentration of 0.05 to 10 parts per 100 parts of rubber.

12. A polymer selected from the group consisting of polyisoprene, polybutadiene, styrene-butadiene rubber, acrylonitrile-butadiene rubber, and neoprene in which the compound of claim 3 has been incorporated in a concentration of 0.05 to 10 parts per 100 parts of rubber.

13. A polymer selected from the group consisting of polyisoprene, polybutadiene, styrene-butadiene rubber, acrylonitrile-butadiene rubber, and neoprene in which the compound of claim 4 has been incorporated in a concentration of 0.05 to 10 parts per 100 parts of rubber.

14. A polymer selected from the group consisting of polyisoprene, polybutadiene, styrene-butadiene rubber, acrylonitrile-butadiene rubber, and neoprene in which the compound of claim 5 has been incorporated in a concentration of 0.05 to 10 parts per 100 parts of rubber.

15. The polymer of claim 14 in which the compound incorporated is 1,10-bis(4-anilinophenoxy)-4,7-dithia-2,9-decanediol.

16. The polymer of claim 14 in which the compound incorporated is 1,10-bis)4-anilino-2-methyl-phenoxy)-4,7-dithia-2,9-decanediol.

17. The polymer of claim 13 in which the compound incorporated is 1,5-bis[3-(4-anilinophenoxy)-2-hydroxypropylthio] cyclooctane.

* * * * *

UNITED STATES PATENT AND TRADEMARK OFFICE
CERTIFICATE OF CORRECTION

PATENT NO. : 4,072,654
DATED : February 7, 1978
INVENTOR(S) : Richard H. Kline

It is certified that error appears in the above-identified patent and that said Letters Patent are hereby corrected as shown below:

In Column 4, Line 68 "iene" should be --diene--.

In Table 1, Line 33, Compound "4" should be --5--.

In Column 4, Line 60, the formula should be $$-\overset{O}{\underset{\|}{O}}C - \overset{(R^7)_{n'}}{\underset{|}{R^6}} ZA$$

Signed and Sealed this

Tenth Day of October 1978

[SEAL]

Attest:

RUTH C. MASON
Attesting Officer

DONALD W. BANNER
Commissioner of Patents and Trademarks